Patented Sept. 5, 1950

2,521,392

UNITED STATES PATENT OFFICE 2,521,392

METHOD FOR THE PREPARATION OF TITANIUM DIOXIDE

Leon Merker, New York, N. Y., and Helmut Espenschied, Metuchen, N. J., assignors to National Lead Company, New York, N. Y., a corporation of New Jersey No Drawing. Application October 14, 1948, Serial No. 54,578

2 Claims. (Cl. 23—202)

The present invention relates to a novel titanium dioxide composition of matter especially adapted for use as a starting material for the preparation of rutile single crystal boules by processes embodying the principles of Verneuil, or modifications of such processes, and to methods for making the same.

In copending application, Serial Number 54,562, filed October 14, 1948, there is described a method for the preparation of rutile single crystal boules. In that application, it is shown that by maintaining certain conditions heretofore unappreciated, it is possible to prepare rutile single crystal boules. One such condition is the purity of the titanium dioxide starting material. It is essential that the starting material be free or at least substantially free from elements possessing ionic radii incompatible with the rutile crystal lattice. The ionic radii of tetravalent titanium is reported to be 0.68 Angstrom unit and it has been found that elements having ionic radii of less than about 0.60 Angstrom unit and greater than about 0.75 Angstrom unit should not be present in the $TiO_2$ starting material in amounts substantially greater than a mere trace, detectible by spectrographic analysis. Elements which have ionic radii between about 0.60 and about 0.75 Angstrom unit are compatible with tetravalent titanium and may be present in somewhat more than spectrographically detectible traces. These enter the crystal lattice structure of the rutile single crystal to form a solid solution, whereas elements which have ionic radii outside the range specified are not capable of forming solid solutions with the titanium dioxide and hence inhibit the formation of the rutile single crystal.

Furthermore, the starting material should be free or at least substantially free from elements which react with titanium, or titanium dioxide to form chemical compounds. The compounds formed from such elements crystallize in their own distinctive pattern, incompatible with the rutile single crystal. Thus, magnesium which has an ionic radii within the specified range and would, therefore, ordinarily be compatible is unacceptable because it forms with $TiO_2$, magnesium titanate.

Impurities which commonly occur in titanium dioxide but which are incompatible with the rutile crystal are principally silicon, magnesium, and lead, and these in general should not be present in amounts greater than 0.15% silicon, calculated as $SiO_2$; 0.005% magnesium, calculated as $MgO$; and 0.002% lead, calculated as $PbO$. In this connection, however, it should be pointed out that some amount of compatible elements which may be present in the $TiO_2$ starting material as impurities or added as such to impart a desired color to the final rutile crystal may act as solvents for elements which are incompatible, thereby raising the minimum amount of such impurities which may be present without preventing formation of the rutile single crystal boule. Thus, vanadium and iron, which imparts to the final rutile crystal definite colorations will tend to raise the tolerance toward silicon. It will be appreciated that a maximum upper limit for the content of incompatible impurities cannot be precisely given, but for the production of a rutile single crystal boule having a maximum purity and a minimum of internal stresses, the $TiO_2$ starting material should be free or at least substantially free from incompatible impurities, as explained above. A satisfactory $TiO_2$ starting material for the preparation of rutile single crystal boules should not contain more than about 0.3% total incompatible impurities.

The present invention contemplates finely divided $TiO_2$ which is free, or at least substantially free from more than a trace of elements having ionic radii incompatible with the rutile crystal lattice as well as elements which react with titanium or titanium dioxide to form chemical compounds. The invention further contemplates methods for the production of such titanium dioxide.

According to one preferred method for producing the novel titanium dioxide of the present invention, a titanium compound is reacted with an ammonium salt to form the complex double ammonium-titanium-sulfate which is then decomposed by heating at an elevated temperature leaving a residue of pure, finely-divided titanium dioxide of the present invention.

The preparation of the ammonium-titanium-sulfate may be carried out in any convenient manner. It is preferred, however, to react titanium tetrachloride with ammonium sulfate. When carrying out the invention according to this embodiment, undiluted relatively pure titanium tetrachloride is added to a saturated solution of substantially pure ammonium sulfate which, in order to secure completeness of reaction, may contain some solid ammonium sulfate. The solutions should be chilled before addition to prevent hydrolysis of the titanium. The double ammonium-titanium-sulfate precipitates immediately upon the introduction of the titanium tetrachloride to the ammonium sulfate and is then recovered from the supernatant hydrochloric acid liquor. It should be purified preferably by recrystallization as will be subsequently explained.

The double ammonium-titanium-sulfate may also be prepared from other titanium salts, for example, titanyl sulfate, obtained in known manner by digesting in sulfuric acid the titanium hydrate obtained by the hydrolysis of titanium sulfate solutions. The titanyl sulfate, $TiOSO_4$, is preferably admixed with an equal amount of water, and the resulting mixture added to the ammonium-sulfate-solution.

The double ammonium-titanium-sulfate may also be prepared from a solution of titanium sulfate or an ilmenite solution having a varying molar ratio of $TiO_2$ to $H_2SO_4$. However, for the best result and greatest yield, the double salt should be prepared either from titanium tetrachloride or titanyl sulfate. Having prepared the crude ammonium-titanium-sulfate, it is then desirable to purify it, preferably by recrystallization, in order to meet the required previously mentioned impurity tolerances. The ammonium-titanium-sulfate is dissolved in dilute sulfuric acid, for instance, a sulfuric acid of a concentration between about 25–35% $H_2SO_4$, more particularly about 30% $H_2SO_4$. The purified ammonium-titanium-sulfate is then crystallized from the sulfuric acid solution by adding thereto solid ammonium-sulfate. The resultant crystals are substantially pure ammonium-titanium-sulfate. In the practice of the present invention, these crystals are dried and then decomposed by heating at elevated temperatures to yield a titanium dioxide starting material suitable for the manufacture of single crystal rutile boules.

The decomposition of the ammonium-titanium-sulfate may be carried out at temperatures ranging from about 850° C. to 1100° C. Between 850° C. and 900° C. there results a titanium dioxide of an ultimate unit particle size averaging between 0.1 micron and 0.5 micron. Crystal growth begins at about 900° C. and the material is completely converted to rutile at temperatures about 900° C. Generally speaking, the invention should be operated in such manner as to obtain from the decomposition of the ammonium-titanium-sulfate, rutile titanium dioxide having the smallest possible ultimate unit particle size consistent with complete rutile formation. Thus, it is desirable to operate at a temperature of about 900° C., or slightly below, carrying on the heat treatment for about 1–2 hours. The product obtained possesses an open structure and has a spongelike or fluffy appearance.

The foregoing description has been given for purposes of illustration, but the invention is not to be limited thereto and various modifications and variations within the scope of the appended claims may be employed.

We claim:

1. Method for the preparation of titanium dioxide having an ultimate unit particle size not in excess of about 0.5 micron and capable of forming upon fusion rutile single crystals which comprises calcining ammonium-titanium-sulfate at temperatures between about 850° C. and about 1100° C. until the ammonium and sulfate constituents are substantially completely removed by volatilization and the residual titanium dioxide has the rutile crystal structure.

2. Method for the preparation of titanium dioxide having an ultimate unit particle size not in excess of about 0.5 micron and capable of forming upon fusion rutile single crystals which comprises calcining ammonium-titanium-sulfate at temperatures between about 850° C. and 900° C. for from about one hour to about two hours.

LEON MERKER.
HELMUT ESPENSCHIED.

REFERENCES CITED

The following references are of record in the file of this patent:

UNITED STATES PATENTS

| Number | Name | Date |
|---|---|---|
| 670,819 | Spence | Mar. 26, 1901 |
| 681,993 | Spence | Sept. 3, 1901 |
| 1,357,690 | Coffelt | Nov. 2, 1920 |
| 2,062,133 | Kubelka | Nov. 24, 1936 |
| 2,347,496 | Muskat et al. | Apr. 25, 1944 |

OTHER REFERENCES

"Gems and Gem Materials" by Kraus and Slawson, page 126, 1941, 4th ed., McGraw Hill Book Publishing Co., N. Y.